United States Patent [19]

Li

[11] Patent Number: 5,607,489
[45] Date of Patent: Mar. 4, 1997

[54] VITREOUS GRINDING TOOL CONTAINING METAL COATED ABRASIVE

[75] Inventor: Rounan Li, Shrewsbury, Mass.

[73] Assignee: Norton Company, Worcester, Mass.

[21] Appl. No.: 670,857

[22] Filed: Jun. 28, 1996

[51] Int. Cl.⁶ ........................................................ B24D 3/34
[52] U.S. Cl. ................................. 51/309; 51/295; 51/307
[58] Field of Search .............................. 51/295, 307, 308, 51/309

[56] References Cited

U.S. PATENT DOCUMENTS

| | | | |
|---|---|---|---|
| 3,925,035 | 12/1975 | Keat | 51/309 |
| 3,984,214 | 10/1976 | Pratt et al. | 51/295 |
| 4,157,897 | 6/1979 | Keat | 51/295 |
| 4,951,427 | 8/1990 | St. Pierre | 51/308 |
| 5,203,886 | 4/1993 | Sheldon et al. | 51/309 |
| 5,250,086 | 10/1993 | McEachron et al. | 51/309 |
| 5,300,129 | 4/1994 | Clark | 51/295 |
| 5,472,461 | 12/1995 | Li | 51/309 |
| 5,474,583 | 12/1995 | Celikkaya | 51/295 |

FOREIGN PATENT DOCUMENTS 2116475   5/1990   Japan.

*Primary Examiner*—Deborah Jones
*Attorney, Agent, or Firm*—Mary E. Porter

[57] ABSTRACT

A vitreous bonded abrasive tool comprises 12 to 50% bond, 5 to 50% metal coated superabrasive, at least 10% porosity and 2 to 20% solid lubricant. The abrasive tool containing titanium or nickel coated diamond is particularly effective in grinding ceramic material, such as sapphire.

9 Claims, No Drawings

VITREOUS GRINDING TOOL CONTAINING METAL COATED ABRASIVE

This application claims the benefit of U.S. provisional application Ser. No. 06/015,112 filed Apr. 10, 1996.

BACKGROUND OF THE INVENTION

This invention relates to abrasive tools containing metal coated superabrasives in a vitrified bond. The tools are particularly useful in the high performance grinding of ceramics.

When first introduced, synthetic diamond, including synthetic diamond coated with metals such as nickel or copper, was used in a variety of resin bonded and metal bonded abrasive tools. Early versions of such tools are described in U.S. Pat. No. 3,925,035 and U.S. Pat. No. 3,984,214. In metal bonded wheels, metal coated diamond is indicated for less severe grinding conditions. The thin nickel or copper coating on the diamond apparently improves adhesion and heat transfer of the synthetic diamond in abrasive wheels.

Due to the difficulty in bonding diamond to the glass of the vitrified bond matrix and the high temperature firing cycles needed to cure vitrified bonded abrasive tools, synthetic diamond and CBN were not used in vitrified bonds when these grains were first introduced. More recently, as described, e.g., in U.S. Pat. No. 4,157,897 and U.S. Pat. No. 4,951,427, metal coated diamond and cubic boron nitride (CBN) have been suggested for use in vitrified bonded abrasive tools.

Other protective coatings have been suggested. To protect CBN from oxidation during firing of vitrified bonded tools, a coating of a thin inner layer of a reactive glass or ceramic and, optionally, an outer layer of a vitreous material may be coated onto the abrasive grain as described in U.S. Pat. No. 5,300,129. The metal or glass coatings prevent the reaction between CBN and the alkali metal oxides of the bond and creation of gaseous byproduct and bloating at the grain/bond interface during firing of the bond. The bloating may cause loss of shape of the abrasive tool.

Many of the improvements in vitreous bonded tools since the introduction of metal coated superabrasive relate to the grinding of steel and other metals, particularly the grinding of metals using CBN abrasive. Little has been reported on the use of coated diamond in vitreous bonded tools for use in grinding ceramics and other non-ferrous materials.

In U.S. Pat. No. 4,157,897, copper, silver, nickel, cobalt, molybdenum and alloys thereof are suggested for coating diamond for use in vitrified bonded tools containing 23 to 53%, on a bond volume basis, of crystalline (flake) graphite for the dry grinding of cemented carbide articles. The tools of the invention include grinding wheels containing no more than 10% total porosity and hones containing no more than 15% porosity. The metal cladding is an optional element of the abrasive tools and no measurable improvement is reported in grinding performance on cemented tungsten carbide of the nickel coated diamond relative to uncoated diamond.

It has now been discovered that metal coated superabrasive will significantly improve the grinding performance of vitreous bonded abrasive tools containing at least 10% porosity and about 2 to 20% solid lubricant, such as graphite. Grinding performance improvements include a higher ratio of material removal rate relative to abrasive wheel wear rate (G-ratio), reduced surface waviness on the workpiece. These improvements have been particularly beneficial in the surface grinding of the sapphire windows commonly used in retail store scanning devices.

SUMMARY OF THE INVENTION

The invention is a vitreous bonded abrasive tool, comprising 12 to 50% bond, 5 to 50% metal coated superabrasive, at least 10% porosity and 2 to 20% solid lubricant. The abrasive tool preferably contains titanium, copper or nickel coated diamond. The abrasive tool containing coated diamond is characterized by a higher modulus of rupture and a higher G-ratio than that of an equivalent abrasive tool containing uncoated diamond. The abrasive tool is preferably a wheel manufactured by hot pressing a mixture comprising the bond, metal coated superabrasive, solid lubricant, and optionally, secondary abrasive or filler in a mold having a size and shape desired in the finished wheel.

DESCRIPTION OF THE PREFERRED EMBODIMENTS

The abrasive tools of the invention include bonded abrasive wheels, discs, wheel segments, stones and hones, comprising, by volume after firing, 12 to 50% bond, 5 to 50% metal coated superabrasive, at least 10% porosity, 2 to 20% solid lubricant, and, optionally, up to 40% fillers, secondary abrasives and processing aids.

Superabrasives useful in the abrasive tools include diamond, natural and synthetic, and CBN and combinations thereof, which have been coated with 0.5 to 80% preferably 0.5 to 35%, most preferably 0.5 to 10%, by weight, of at least one metal or metal alloy. For coated diamond, 0.5 to 10%, by weight of metal coating is preferred. A coating in excess of 60% is likely to yield bloating in cold pressed wheels, while a coating in excess of 35% is likely to yield poor grinding results for hot pressed wheels used in surface grinding operations.

The abrasive grain is coated with a metal to improve wetting of the grain with the glass of the bond during firing, to improve bond/grain post size and strength and to reduce premature grain loss during grinding from bond failure. It has been suggested that the metal and/or a metal oxide or carbide forms an improved bond between the glass and the abrasive grain. The presence of the carbide or oxide in the coating or formed during firing, in addition to the metal, is believed to improve performance of the abrasive tools. These effects are believed to result in a better material removal rate/tool wear ratio, greater wheel strength and better workpiece surface quality, providing a safer, more economical abrasive tool.

While any metal which is compatible with a vitreous bond may be used, preferred metals are titanium, nickel, copper, silver, cobalt, molybdenum, combinations thereof and alloys thereof. Titanium coated diamond is preferred for grinding ceramic material, especially sapphire. Nickel and nickel alloys also are preferred. Suitable abrasive grain includes, for example, RVG diamond available from General Electric coated with about 8–10% titanium.

Any superabrasive grain size may be used. For diamonds used in grinding ceramic materials, U.S. Standard Mesh grain sizes of 50/80 to 325/400, preferably 80/120 to 270/325 (100 to 320 grit), are selected. Similar grain sizes are preferred for CBN. In certain applications, very fine grain in the micron size ranges (i.e., 0.5 to 500 micrometers) is suitable.

Any of the many known vitrified or glass bonds may be used, including typical bonds comprising silica, boron oxide, sodium oxide, aluminum oxide and alkali and alkaline earth metals. The bond materials may be in the form of a mixture of raw components, a glass frit which has been crushed and screened to a desirable particle size, or a combination of the two. Representative bonds suitable for use herein are described in U.S. Pat. No. 5,472,461 and U.S. Pat. No. 5,203,886, which are hereby incorporated by reference.

To achieve the full benefit of the coated diamond in the abrasive tool it is necessary to provide a porous abrasive tool having at least 10% porosity, preferably at least 15% porosity, and most preferably 20% porosity, based on abrasive tool volume. Up to about 25% porosity may be achieved by adjusting the hot pressing process in manufacturing the abrasive tools. Porosity also may be induced by the addition to a mixture of the abrasive grain and bond components of hollow ceramic spheres and other high temperature resistant materials having an appropriate geometry to create bubbles pores or channels in the fired tool. Hollow ceramic spheres of the type described in U.S. Pat. No. 5,472,461 and similar spheres of a smaller diameter are most preferred. With the addition of such fillers, a preferred total porosity of 10 to 50% by volume of the fired abrasive tool, may be achieved.

Porosity, in combination with lubricants supplied in solid form as part of the tool composition, or with liquid coolants added during wet grinding operations, assists in the removal of grinding debris from the tool face and the workpiece and in supplying the lubricant to the grinding surface to cool and lubricate the tool and the workpiece, providing improved grinding performance. The skilled practitioner will select a balance of porosity and solid lubricant in the tool composition to maximize these benefits and permit dry as well as wet grinding operations. The combination of porosity and solid lubricant is 12 to 60, preferably about 20 to 40%, by volume of the total tool after firing.

The preferred solid lubricant is graphite, particularly fine, flake graphite. An example of a suitable graphite is described in U.S. Pat. No. 5,472,461 and it may be obtained from Asbury Graphite Mills, Inc. Also useful in the abrasive tools of the invention are molybdenum sulfide, polytetrafluoroethylene, hexagonal boron nitride and other solid lubricants known to be suitable for use in vitrified bonded abrasive tools.

Other, optional abrasive tool components may be utilized. Skilled practitioners often add secondary abrasives to tool mixtures comprising superabrasives to reduce the overall cost of the tool. Secondary abrasives, including but not limited to, alumina and fused alumina abrasives, sol gel, seeded and unseeded, alpha-alumina abrasives, silicon carbide, and the like, may be used at levels of about 0.1 to 40%, preferably about 1 to 20% by volume of the fired abrasive tool. The combined content of superabrasive and secondary abrasive grain is preferably about 40 to 50%, by volume of the abrasive tool Likewise, fillers in various shapes and physical forms, including, but not limited to, metal powder, hollow ceramic or glass spheres, silicon carbide, alumina, solid mullite, fumed silica, titanium dioxide, may be added in amounts effective to enhance tool manufacture and/or grinding performance, e.g., about 0.1 to 40%, preferably 4 to 10%, by volume of the fired abrasive tool. Processing aids, such as temporary binders, as are known in the art may also be used.

These components of the abrasive tool are typically mixed, screened and placed in an appropriate mold for pressing and firing. Pressing may be done by any means known in the art, including cold and hot pressing and hot coining. Preferred hot pressing techniques are those described in U.S. Pat. No. 4,157,897 and U.S. Pat. No. 5,472,461, which are hereby incorporated by reference. In a preferred process, hot pressing may be carried out at 600° to 900° C. in one minute to four hours, depending upon wheel size and geometry. For cold pressing processes, the abrasive tool in a green, molded shape may be fired under typical commercial firing cycles and conditions to form the final article by methods known in the art. Firing is typically carried out at temperatures from 600° to 1200° C. over a period from a few hours to several days, depending upon the type of pressing and the wheel size and geometry.

The abrasive tool may be balanced and finished by methods currently used and known in the manufacture of vitrified bonded abrasive tools. These abrasive tools of the invention are useful in the manufacture of a variety of ceramic, abrasive and hardened metal articles requiring precision grinding operations.

The example which follows is intended to illustrate the invention and does not in any way limit the scope of the invention. Unless otherwise indicated, all compositions are given on a volume percentage basis after firing the abrasive tool.

EXAMPLE 1

Segmented surface grinding wheels were prepared from the following components utilizing titanium coated diamond abrasive grain (8–10% titanium on 220 grit RVG diamond) obtained from General Electric for comparison with a control containing uncoated diamond (220 grit).

Grinding Wheel Compositions

|  | Sample | | | |
| --- | --- | --- | --- | --- |
|  | 1 | C-1 | C-2 | C-3 |
| Diamond-coated | 37.5 | 0 | 37.5 | 37.5 |
| Diamond-uncoated | 0 | 37.5 | 0 | 0 |
| SiC filler | 10.5 | 10.5 | 10.5 | 10.5 |
| Graphite powder | 4.8 | 4.8 | 14.8 | 19.8 |
| Glass frit bond | 27.2 | 27.2 | 27.2 | 27.2 |
| Porosity | 20.0 | 20.0 | 10.0 | 5.0 |

Sample 1 represents the invention, C-1 is the uncoated diamond control and samples C-2 and C-3 represent the wheels of U.S. Pat. No. 4,157,897 to Keat, except the diamonds in the Keat wheels were coated with nickel rather than titanium.

The bond was a typical silica-aluminoborate bond in the form of glass frit obtained from Ferro Corporation.

The silicon carbide secondary abrasive (220 grit) was obtained from Norton Company. The graphite (4434 grade) was obtained from Asbury Graphite Mills, Inc., and had a fine particle size of about 100 to 325 mesh. The wheels (measuring 25.4 cm in diameter and 3.2 cm in thickness) (10 inches by ⅛ inch) were manufactured from these compositions by the hot pressing process described in Example 1 of U.S. Pat. No. 5,472,461 to Li. The wheels were subjected to wet grinding tests under the following conditions:

Machine: Blanchard Grinder
Wheel Speed: 1150 rpm
Table Rotation: 64 rpm
Downfeed: 0.010 cm (0.004 inch)
Coolant: Challenge 300HT coolant obtained from Interservice Dynamics, Bethel, CT at 1% in deionized water Material Ground: Sapphire
Grinding Test Results

|  | Sample: | | | |
|---|---|---|---|---|
|  | 1 | C-1 | C-2 | C-3 |
| G-ratio (ratio of material removed/wheel wear) | 305 | 36 | 87 | 150 |
| Power (Watts) | 1413 | 560 | 2920 | 2960 |

Results as shown above indicate a significant G-ratio improvement (about 9 times better) for the titanium coated diamond sample of the invention relative to the uncoated diamond sample at the same levels of lubricant and porosity. Among the titanium coated diamond samples, lower porosity adversely affected both the G-ratio and power draw. At 5 and 10 porosity using coated diamond as taught by the Keat patent, the G-ratio was less than half of that achieved with the invention and the power draw was doubled.

I claim:

1. A vitreous bonded abrasive tool having at least 10% porosity and comprising 12 to 50% bond, 5 to 50 % metal coated superabrasive, and 2 to 20% solid lubricant.

2. The vitreous bonded abrasive tool of claim 1, further comprising 4 to 10% filler and 0 to 20% secondary abrasive.

3. The vitreous bonded abrasive tool of claim 1, wherein the metal coated superabrasive is diamond coated with a metal selected from the group consisting of titanium, copper and nickel and alloys thereof and combinations thereof.

4. The vitreous bonded abrasive tool of claim 3, wherein the metal coated superabrasive is synthetic diamond coated with 0.5 to 35%, by weight, of titanium.

5. The vitreous bonded abrasive tool of claim 1, wherein the solid lubricant is graphite.

6. The vitreous bonded abrasive tool of claim 5, wherein the vitreous bonded abrasive tool is a wheel formed by hot pressing a mixture comprising bond, metal coated superabrasive and graphite in a mold at temperatures of about 600°–900° C. for about 1 minute to 4 hours.

7. The vitreous bonded abrasive tool of claim 6, wherein the vitreous bonded abrasive tool has a modulus of rupture at least two times higher than an equivalent vitreous bonded abrasive tool containing no metal coated diamond.

8. The vitreous bonded abrasive tool of claim 6, wherein the vitreous bonded abrasive tool has a G-ratio in surface grinding of ceramic material at least two times higher than an equivalent vitreous bonded abrasive tool containing no metal coated diamond.

9. The vitreous bonded abrasive tool of claim 8, wherein the ceramic material is sapphire.

* * * * *